Sept. 23, 1947.  C. R. MIDTLYNG ET AL  2,427,685
METHOD OF SECURING INNER AND OUTER SLEEVES TO HOSE ENDS
Filed Jan. 15, 1944  6 Sheets-Sheet 1

INVENTORS
CARL R. MIDTLYNG
HENRY S. YOUNG, JR.
BY
ATTORNEY

Sept. 23, 1947.  C. R. MIDTLYNG ET AL  2,427,685
METHOD OF SECURING INNER AND OUTER SLEEVES TO HOSE ENDS
Filed Jan. 15, 1944  6 Sheets-Sheet 2

INVENTORS
CARL R. MIDTLYNG
HENRY S. YOUNG, JR.
BY
ATTORNEY

Sept. 23, 1947. C. R. MIDTLYNG ET AL 2,427,685
METHOD OF SECURING INNER AND OUTER SLEEVES TO HOSE ENDS
Filed Jan. 15, 1944 6 Sheets-Sheet 3
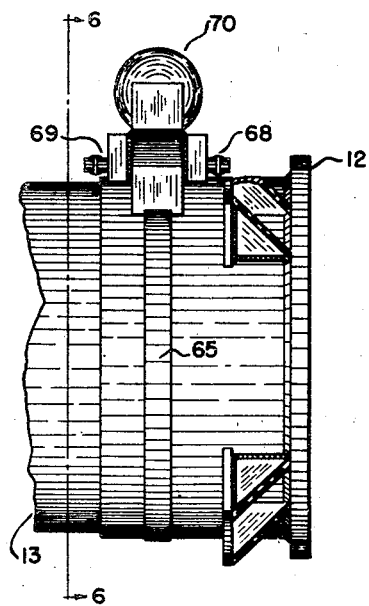
_F19-5_
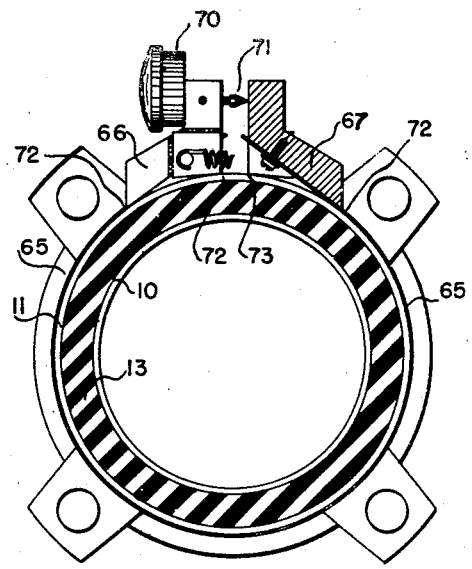
_F19-6_
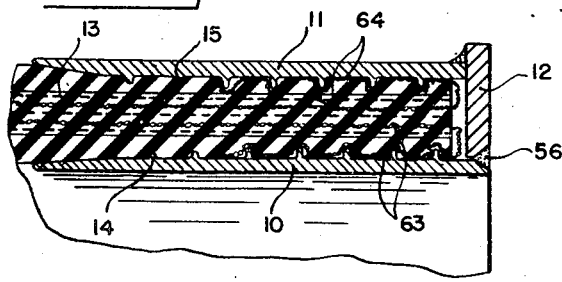
_F19-13_
INVENTORS
CARL R. MIDTLYNG.
HENRY S. YOUNG, JR.
BY
ATTORNEY Sept. 23, 1947. C. R. MIDTLYNG ET AL 2,427,685
METHOD OF SECURING INNER AND OUTER SLEEVES TO HOSE ENDS
Filed Jan. 15, 1944 6 Sheets-Sheet 4

INVENTORS
CARL R. MIDTLYNG
HENRY S. YOUNG
BY
ATTORNEYS

Sept. 23, 1947.  C. R. MIDTLYNG ET AL  2,427,685
METHOD OF SECURING INNER AND OUTER SLEEVES TO HOSE ENDS
Filed Jan. 15, 1944  6 Sheets-Sheet 5

INVENTORS
CARL R. MIDTLYNG
HENRY S. YOUNG, JR.
BY
ATTORNEY

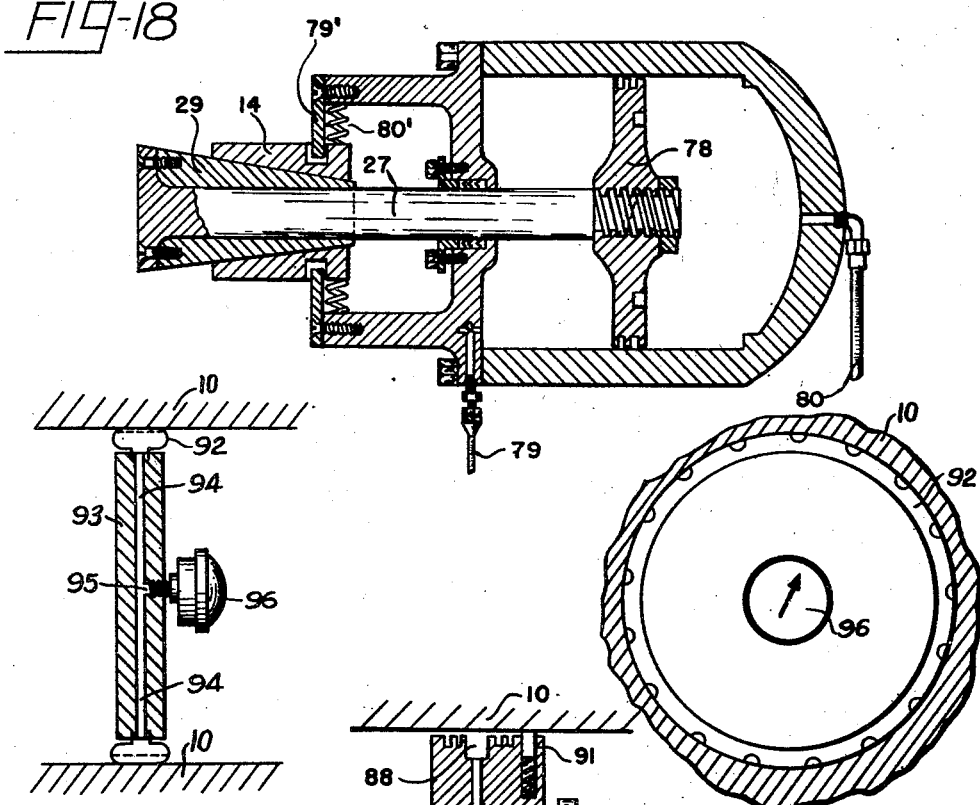

Patented Sept. 23, 1947

2,427,685

UNITED STATES PATENT OFFICE 2,427,685

METHOD OF SECURING INNER AND OUTER SLEEVES TO HOSE ENDS

Carl R. Midtlyng and Henry S. Young, Jr., United States Navy

Application January 15, 1944, Serial No. 518,380

3 Claims. (Cl. 29—148.2)

(Granted under the act of March 3, 1883, as amended April 30, 1928; 370 O. G. 757)

The present invention relates to hose couplings, especially for large diameter hoses, such as used in handling fuel oil and other bulk liquids on ships and docks and at refineries, chemical plants, dredging operations and the like. This invention has particular relation to connections, technique, and tools adapted to grip the hose carcass between inner and outer sleeves to form a particularly strong and leakproof coupling.

It has been found commercially that until this time, hose couplings, having internally expanded nipples or externally contracted sleeves have not been suitable for service for hoses in size of over four inches internal diameter. Because of this adverse experience it has been necessary for the industry to build or mold special ends on each piece of hose. These ends which are an integral part of the hose have many disadvantages resulting from the complications in manufacture of the hose, extra weight and bulk during the life of the hose, and abnormally short life in some cases, for, if the coupling fails it cannot be rebuilt or replaced. The new coupling and technique herein disclosed is not only better for new construction but can be used to repair hoses originally equipped with the built on connections.

One of the objects of the present invention is the provision of a hose coupling which involves the clamping of the hose between inner and outer sleeves with a controlled maximum pressure as permitted by the mechanical properties of the hose material. The pressure of this grip acting on the area of the hose in contact with the inner and outer sleeves develops friction of sufficient magnitude to prevent the hose being pulled from the coupling in service. It is found that for optimum results this clamping pressure should be of the order of the ultimate tensile strength of the elastomer which for present materials range from 800 to 6000 pounds per square inch. The additional factors of coefficient of friction, and factors of safety must be used in calculation of the gripping area required, as known to engineers.

Another object of the invention is to secure the inner and outer sleeves of the hose connections to each other or a common frame so that the tensile forces tending to pull the hose axially from the coupling will be distributed between the inner and outer sleeves in such a manner as to distribute the load to all layers of the carcass and reduce to a minimum the shearing forces commonly introduced.

Another object of the invention is to use one sleeve, either the inner or outer, of such elasticity that the gripping pressure produced on the hose can be conveniently determined by simple measurements of the strain produced. These measurements can be recorded most simply by stamping the dimensions on the coupling where in later years they can be used to check the condition of the hose being gripped. In case of relaxation, from any cause, the coupling can be further tightened by a reapplication of the tools originally used for assembly. The spring effect of the elastic sleeve on one side of the hose, in addition, provides a function of maintaining the gripping pressure within allowable limits during changes caused by service conditions and age.

Another object of the invention is the implementation of the above measurements by developing suitable gauges for the purpose. When the outer sleeve is used as the spring element, its unstressed circumference and later expanded circumference are conveniently measured by a thin steel band, which may be provided either with vernier scales or suitably mounted dial gauges, to measure the strain. An accuracy of $\pm.001$ inch has been found ample for the purpose. Direct measurement of circumferences has been found most practical, as due to irregularities in the thicknesses of the hose wall, the sleeves may be distorted considerably from the true circular shape, making the averaging of usual diametrical measurements tedious and inaccurate. Although it is preferred to use the outer sleeve as the resilient member due to its greater circumference, the inner sleeve in special constructions could be so used, and measurements made by various forms of mechanical or hydraulic gauges.

Another object of the invention is to provide a multiplicity of ridges of unusual shape and spacing on the surface of the sleeves contacting the hose. The ridges in all cases on the two sleeves are staggered so that when the hose is clamped between them it will be preloaded in axial tension. This preloading reduces the distortion from external load to a minimum, reducing the possibility of the hose working out of the coupling. The height of the ridges is determined by the thickness and resilience of the hose. For elastomers having only a limited "cold flow" effect and normal hardness of 30 to 50 durometer, the height of the ridges should be from $\frac{2}{3}$ to $\frac{1}{3}$ the thickness of the tube or cover with which they come in contact. The ridges should be well rounded at the apex and filleted at their bases to prevent undue concentrations of stress which would occur at sharp corners resulting in tears in the elastomer. Most present couplings use a series of serrated ridges without relation to one another, for the purpose of increasing the friction resistance against the coupling being pulled apart. The desired ridges herein used normally should be spaced at distances of 1.5 to 10 times their height depending on the thickness of the hose. In the case of elastomers having a marked "cold flow" effect it is necessary to use two heights of ridges, the first one or two of the usual height to seal the fluid being handled from the joint, then a number of ridges of height equal to the thickness of the tube or cover that they respectively contact, to dam off sections of the elastomer so that a grip can be maintained on the hose without the material flowing out of the joint.

Another object of the invention is in use of the outer sleeve as the preferred spring member, to expand the inner sleeve so that its inside diameter is as great or greater than the internal diameter of the hose, resulting in a minimum of restriction to the flow thru the hose. In some types of hose using wire or banding to stiffen or strengthen the fabric it is not desirable to obtain all the grip by internal expansion. In this case it is most practical to contract the outer sleeve in a preliminary operation resulting in a sizing and taking up of necessary clearances for assembly, then the final pressure is applied to the hose by expanding the inner sleeve in the described manner.

Another object of the invention is to obtain a joint which is primarily held by friction. The smooth formed ridges are a means of producing the high degree of roughness required, without danger of tearing the tube or cover. Under heavy loads beyond the capacity of the hose or fittings this joint will slip very slowly giving ample warning of the danger. A line painted on the hose at the coupling is an aid in detecting this condition.

Another object of the invention is to make positive contact between the static wires, built into the hose, and the coupling. At the same time these wires are used to vent the air that would ordinarily be trapped between the ridges during assembly.

A further object of the invention is to obtain a coupling design suited to high strength materials such as stainless and spring steel which when economically used give high performance for a minimium of weight. Those same principles now understood can be applied to advantage in the design of similar light metal couplings as aluminum and magnesium alloys.

Another object of the invention is the use of independent inner and outer sleeves to facilitate assembly and easier expansion and then join the two by one of several possible methods. One method is by the use of a special rolling tool later described for securing the inner sleeve to the base ring in a leakproof joint. Another method is by the use of arc welding which can be accomplished without overheating the elastomer by a combination of welding only short distances at a time, cooling the coupling and locating the weld a reasonable distance from the hose.

Another object of the invention is the development of special tools for expanding the inner sleeve for the required amount as later described.

Another object of the invention is the development of a coupling adapted to the use of any common method of joining with an adjacent coupling or fitting, as male or female threads, flanges, floating flanges, brackets or collars.

With these and other objects in view, as well as other advantages that may be incident to the use of the improvements, the invention consists in the parts and combinations thereof hereinafter set forth and claimed, with the understanding that the several necessary elements constituting the same, may be varied in proportion and arrangement without departing from the nature and scope of the invention, as defined in the claims.

In order to make the invention more clearly understood, there are shown in the accompanying drawings, means for carrying the invention into practical use, without limiting the improvements in their useful application to the particular construction, which, for the purpose of explanation, have been made the subject of illustration.

In the accompanying drawings:

Figs. 5 and 6 show side and end elevations of one form of circumference gauge used to measure strain in the outer sleeve;

Fig. 13 is similar to Fig. 11 except showing the positioning of static wires;

Fig. 18 is a longitudinal section of a tool, for initially expanding the inner sleeve into gripping contact with the hose carcass, which is motivated hydraulically;

Fig. 19 is a longitudinal section of an air gage for use in comparing the internal circumference of a hollow cylinder with that of master standards;

Fig. 20 is a longitudinal section of a hydraulic gage for use in comparing the internal circumference of hollow cylinders with that of master standards;

Fig. 21 is an end elevation of the gage shown in Fig. 20.

Figure 1:
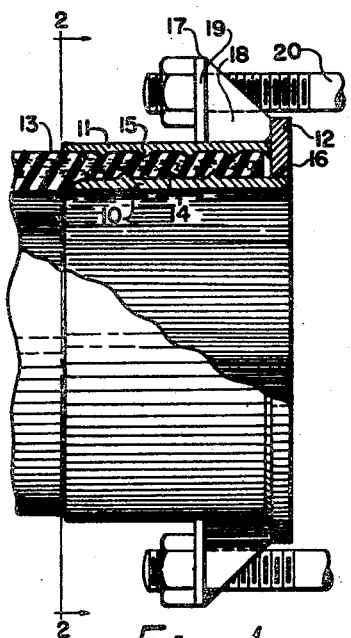
Fig. 1 is a view partly in side elevation and partly in longitudinal section of a hose coupling embodying the invention.
Figure 2:
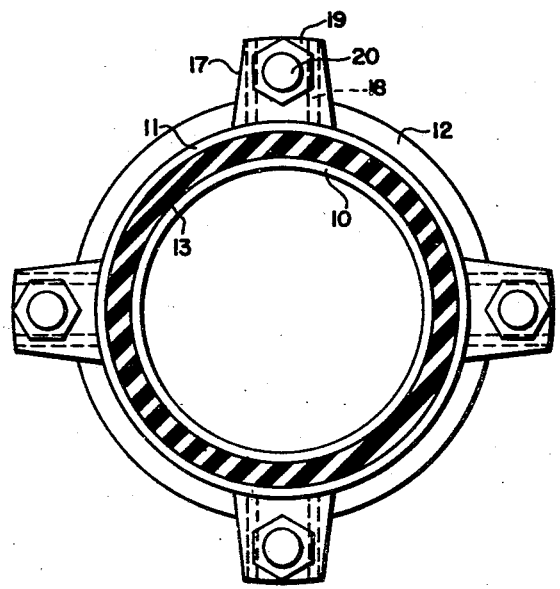
Fig. 2 is an end elevational section view of the structure shown in Fig. 1.

Referring to the drawings, and particularly to Figs. 1 and 2 thereof, a hose connection embodying the invention is shown as comprising an inner cylindrical sleeve 10 and an outer cylindrical sleeve 11 to the outer end of which a connecting ring or collar 12 is secured, preferably by welding. The sleeves 10 and 11 embrace the end of a hose carcass 13 which is gripped therebetween by expanding the inner sleeve 10 in a manner presently to be described. The inner and outer sleeves 10 and 11 are formed with exterior and interior circumferential ribs, beads, or ridges 14 and 15 respectively, which are embedded in the hose carcass when the inner sleeve is expanded into gripping engagement with the hose whereby a leakproof seal is effected and at the same time providing the necessary degree of roughness to insure against axial displacement of the hose. One method of securing the outer end of the inner sleeve 10 is shown, accomplished by upset of same in a second expanding operation, as described later, so that a portion of the metal thereof, flows radially into the annular groove or grooves 16 formed in the collar 21 which securely interlocks the inner sleeve 10 and the collar 12 and the outer sleeve 11 to which the collar is secured.

Brackets 17 having spaced parallel buttresses 18 connected by a transverse plate 19 are welded to the outer sleeve 11 and the connecting ring 12 and are adapted to receive the usual connecting bolts 20. This type of bracket is of light weight and exceedingly strong in resisting the tightening stress exerted by the bolts 20.

Figure 14:
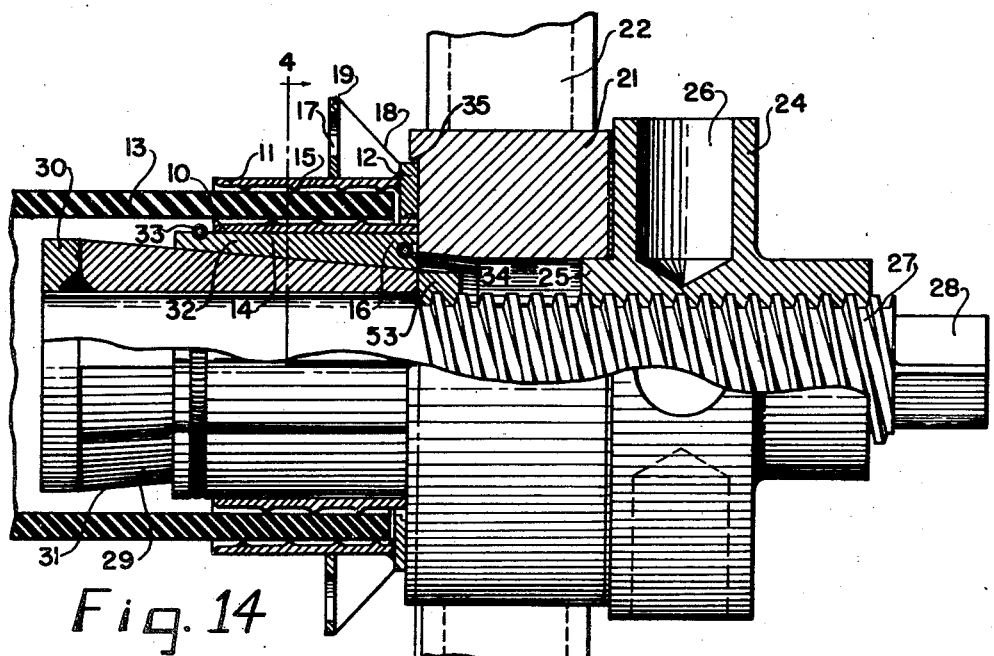
Fig. 14 is a view partly in side elevation and partly in longitudinal section of a tool for expanding the inner sleeve into gripping contact with the hose carcass.

In assembly, the inner sleeve 10 is first expanded into gripping and sealing engagement with the hose carcass 13, by means of an expanding tool shown in Fig. 14 which comprises a tool holding ring 21 which is fixedly mounted on a base 22 by means of legs or bracket members 23 which are welded to the ring and support. A nut 24 is formed with a cylindrical extension 25 adapted to enter ring 21 and maintain the nut centrally located therein, and also with a plurality of sockets 26 adapted to receive a bar or tightening handle when the nut is turned. Threaded into the nut 24 is a jack screw 27 having a squared outer end 28, by means of which the jack screw can be prevented from turning by means of a wrench when the nut is operated, and having a wedging member 29 secured to the jack screw between the welded ring 30 and the spanner nut 53. The wedging member 29 is herein shown as being formed with eight inclined surfaces 31 which slidably support eight wedging bars or segments 32 which are yieldably held in position at their inner and outer ends by circular coil springs 33 and 34. The wedging bars extend entirely around the wedging member and their outer surfaces present an almost continuous circumferential surface for expanding the inner sleeves of hose couplings.

In operation, a hose carcass 13 with the inner and outer sleeves 10 and 11 and the connecting ring 12 mounted thereon, is positioned over the expanding tool, the latter having been previously contracted, until the connecting ring 12 abuts the tool holding ring 21 and is seated within a circular locating and positioning recess 35 formed therein. The jack screw 27 is then held from turning while the nut 24 is tightened until all slack or lost motion is taken up and the wedging bars 32 are expanded into holding engagement with the inner surface of the sleeve 10.

Figure 8:
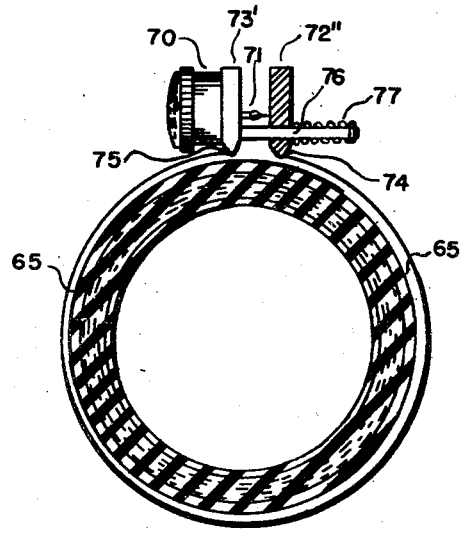

A circumference gage of a type such as shown in Fig. 6 or Fig. 8 is then mounted on the outer sleeve and its measurement taken and recorded. With the jack screw 27 held stationary the nut 24 is forcibly turned by means of a bar or handle inserted in the sockets 26. This draws the jack screw 27 and wedging member 29 to the right, as viewed in Fig. 14, and forces the wedging bars or segments 32 radially outward with a force sufficient to expand the inner sleeve 10 into gripping frictional engagement with the hose carcass 13, the latter being in turn forced into intimate sealing engagement with the outer sleeve 11. The expansion is continued until the circumference gage shows a reading, still within the elastic limit of the outer sleeve, such that when the nut 24 is turned in the reverse direction so as to contract and release the system of wedges, a permanent tension or amount of expansion will be shown to exist in the outer sleeve by the circumference gage. If necessary, the operation is repeated until the desired readings are obtained. When a satisfactory expansion has been obtained, the expander is fully contracted, the circumference gage removed and the hose taken from the expander.

Figure 16:
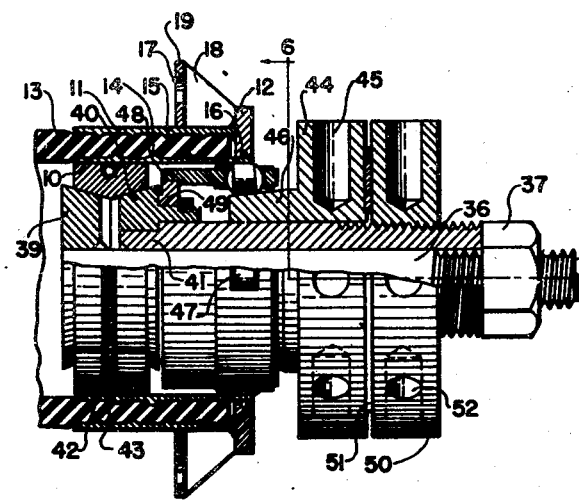
Fig. 16 is a view partly in side elevation and partly in longitudinal section of a tool for upsetting the outer end of the inner sleeve into interlocking engagement with the coupling flange of the outer sleeve.
Figure 17:
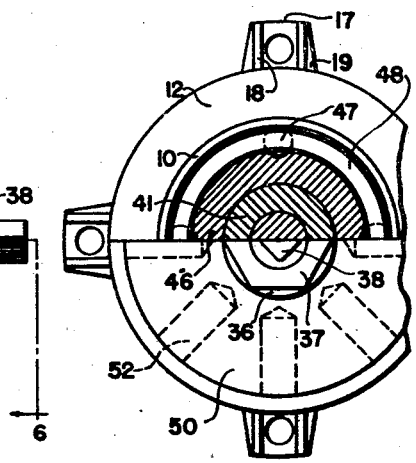
Fig. 17 is a view partly in end elevation and partly in transverse section of the structure shown in Fig. 16.

The connection is now ready to have the inner sleeve secured and sealed to the outer sleeve or its appendages. One method of accomplishing this is by further expansion and rolling of the end of the inner sleeve which is accomplished by inserting the expanding tool shown in Figs. 16 and 17 into the end of the hose. This tool comprises a central arbor 36 the outer end of which has a tightening nut 37 threaded thereon, and is formed with a squared end 38. A wedging member 39 is welded on the inner end of the arbor 36 for cooperation with another wedging member 40 secured to the inner end of an outer arbor 41 which is rotatably and axially slidably mounted on the inner arbor 36. The wedging members 39 and 40 together support a plurality of wedging segments 42 which are held against displacement by a circular coil spring 43 and which are adapted to tightly engage the inner surface of the inner sleeve 10 when they are forced outwardly, in a manner to be described, and maintain the tool as an entirety, against axial movement during the second expanding operation. A spool 44 is rotatably and axially slidably mounted on the outer arbor 41 and is formed with a plurality of sockets 45 to receive a bar or wrench when it is desired to rotate the spool and is also formed with a conical race surface or extension 46 which is adapted to engage a plurality of rollers 47 carried by a cylindrical cage 48 rotatably mounted on a collar or track 49 formed on the wedging member 40.

A nut 50 is threaded onto the outer end of outer arbor 41 and is adapted to engage the spool 44 through a washer or gasket 51 in order to force the spool 44 to the left when the nut is turned by a tool inserted in sockets 52 provided therein, for such purpose. When the tool is inserted in the hose, the nut 37 is first tightened which draws the inner arbor 36 to the right, as viewed in the drawings, and forces the outer arbor to the left. This forces the wedging members 39 and 40 toward each other and segments 42 radially outward until they tightly grip the inner sleeve 10. This is holding contact only to prevent longitudinal movement of the tool and has no expanding action. The nut 50 is then tightened which forces the spool 44 to the left and the conical cam 46 into tight wedging engagement with the rollers 47. The spool 44 is then rotated which causes the rollers to roll out and expand the outer end of the inner sleeve. The nut 50 is continually tightened as the rolling progresses forcing the conical race 46 farther to the left and keeping the rollers 47 in tight engagement with the sleeve. This procedure is continued until the metal of the sleeve is upset and caused to flow into the groove or grooves 16 in the connecting ring 12 so as to lock these elements securely together after which the parts of the tool are loosened and the tool removed.

This results in a very efficient leak-proof union of the parts of the connection without any rupture or separation of the plies of the carcass due to axial shearing forces.

Figure 3:
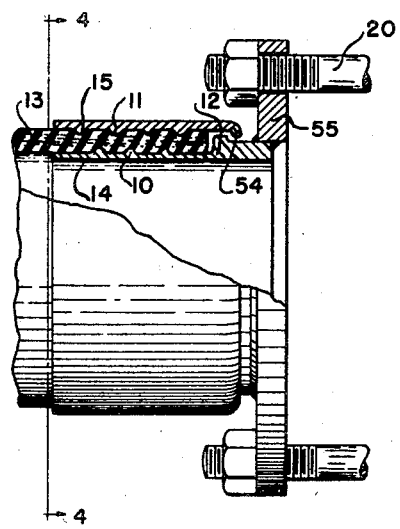
Fig. 3 is a view similar to Fig. 1 except the coupling is arranged for assembly by external contraction instead of internal expansion.
Figure 4:
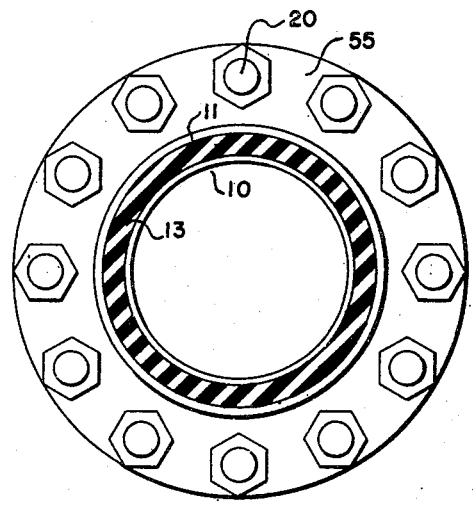
Fig. 4 is an end elevational section view of the structure shown in Fig. 3.

In Figs. 3 and 4 is shown a coupling which holds the hose in a manner similar to the coupling just described except the gripping pressure is applied to the hose by contracting the outer sleeve 11 by means of a swaging die. The gripping pressure is measured by the strain produced in the inner sleeve 10 by means of internal circumference gages as shown in Figs. 19 and 20. The lip 54 which holds the outer sleeve from axial movement may be formed by the die as a part of the first operation, or as a separate operation. The bolting flange 55 is shown as an alternate method of joining the hose coupling to the next fitting.

Figure 9:
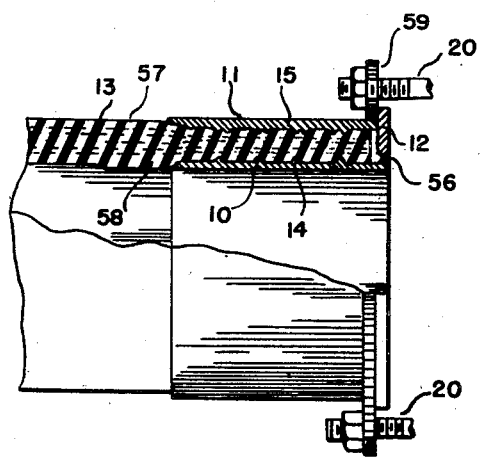
Fig. 9 is similar to Fig. 1 except showing a different ridge and bolting flange arrangement.
Figure 10:
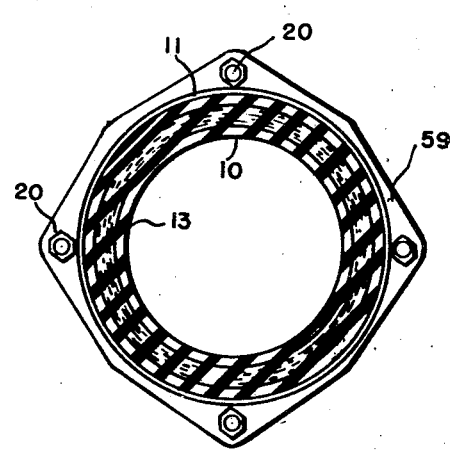
Fig. 10 is an end elevational section view of the structure shown in Fig. 9.

In Figs. 9 and 10 are shown several alternative features in a coupling expanded internally into gripping with the hose as in Fig. 1. To secure the inner sleeve to the other parts of the coupling a weld 56 is made joining the inner sleeve 10 to the ring 12. In the hose shown the outer cover 57 used is thin in comparison with the tube 58 and in order to obtain the proper friction on the inner and outer surfaces of the hose twice as many shallow ridges 15 are used in the outer sleeve as ridges 14 used in the inner sleeve, distributed and complementary to each other as shown. For bolting the coupling to the next fixture the floating flange 59 is shown as an alternate means.

Figure 11:
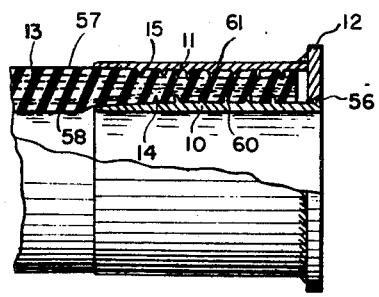
Fig. 11 is similar to Fig. 1 except showing a ridge arrangement suitable for use with elastomers having a "cold flow" characteristic.

For holding a hose, the tube and cover of which are composed of an elastomer having "cold flow" properties, it is necessary to prevent this flow by a construction shown in Fig. 11 by which ridges 60 and 61 are of such height that they will penetrate to the canvas body of the hose. These ridges dam off sections of the elastomer and thus prevent its escaping to release the gripping pressure. Usual height ridges 14 and 15 are also required in this type hose to retain the tube and cover which otherwise have a tendency to become loosened from the body of the hose.

Figure 12:
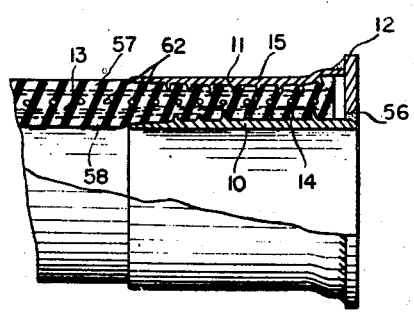
Fig. 12 is similar to Fig. 1 except showing a coupling on a hose having a metal reinforcement requiring an initial external contraction before final expansion from inside.

For hose construction having wire or metal reinforcement as shown in Fig. 12 it is often not desirable to expand or contract the hose circumference in the vicinity of this reinforcement 62. The procedure in this case is to place the outer sleeve over the end of the hose in proper axial position and to dispose the inner sleeve within the hose, proper clearances having been allowed for the easy accomplishment of this assembly. Then the outer sleeve 11, Fig. 12 is swaged in, a predetermined amount. The circumference gage, as shown in Fig. 6 or 8, is then applied to the outer sleeve and the initial reading recorded, the coupling mounted on the internal expander as shown in Fig. 14 or 18 and the internal sleeve 10 expanded to the required hose gripping pressure as indicated by the gage. The inner and outer sleeves are then secured as one unit by one of the accepted methods as shown by the weld 56.

During the deformation of the sleeves into gripping with the hose there is a tendency to trap air between the ridges which interferes with the desired frictional effect and changes the gripping pressure if it subsequently escapes. Fig. 13 shows the use of the electrostatic wires 63 and 64 to form a path for the escape of this gas during the early stages of gripping the hose. The disposition of these wires in this manner also conveniently serves to ground them to the coupling which is necessary to their function as electric conductors.

The external circumference gage referred to previously and shown in Figs. 5 and 6 consists of a flexible but essentially non-stretchable band 65 secured on the ends to blocks 66 and 67 in such a manner that the band will be disposed tangent to the sleeve 11. The blocks pulled together by springs 68 and 69 will have a working distance between themselves within the measuring capacity of the dial gage 70, whose sensitive element 71 projects between the blocks. Each block rests on the perimeter of the sleeve at three points, one where the tape 65 is tangent to the sleeve 11 at 72, the other two on the line at 73 parallel to the axis of the cylinder. Arranged in this way the gage measures increase in circumference at the radial distance at which the dial gage is located and this measurement should be proportioned back to the actual radius of the sleeve.

Figure 7:
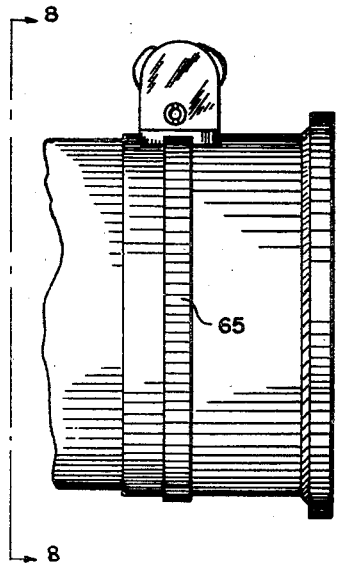
Figs. 7 and 8 show similar views of a gauge depending on different principles.

In Figs. 7 and 8 is shown a gage used for the same purpose as the one just described, but works on somewhat different principles. In this gage a flexible but essentially non-stretchable band 65 is secured to two blocks 72'' and 73' close to the knife edge on each as shown at 74 and 75. The blocks are constrained by the rod 76 to always travel parallel to one another. The spring 77 maintains the blocks in position on the cylinder and keeps tension on the tape. The dial gage 70 in measuring the change in distance between the two blocks directly indicates the change in outer circumference of the cylinder being measured.

Figure 15:
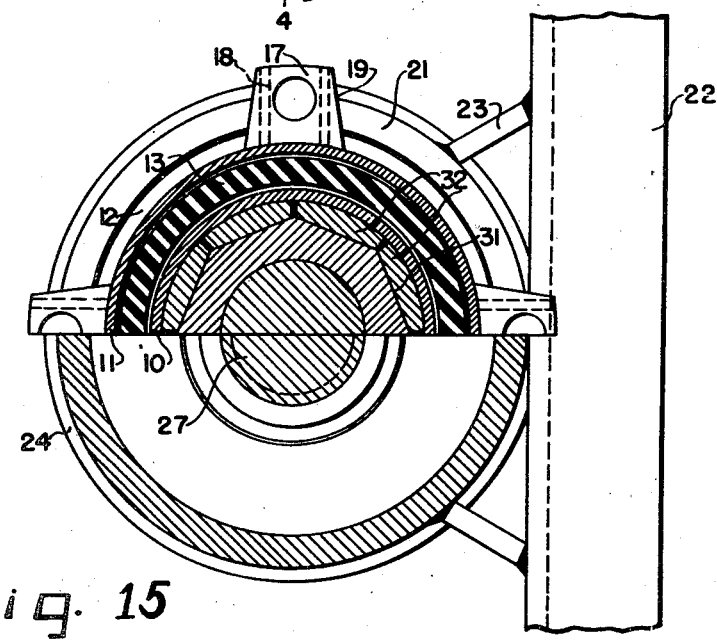
Fig. 15 is an end view partly in transverse section of the structure shown in Fig. 14.

The expansion of internal sleeves may also be conveniently accomplished by a hydraulic tool as shown in Fig. 18 which in many respects is similar to the tool of Figs. 14, 15 previously described. In this tool the hydraulically operated jack shaft 27 carries the polygon cone 29 on which slide the cylindrical faced wedges 14 which contact the sleeve to be expanded. The hydraulic piston 78 operating the jack shaft may be forced in either direction by proper application of the hydrostatic pressure through lines 79 and 80. The segmented plate 79' restricts the wedges from moving axially while the springs 80' keep the wedges in contact with the polygon cone.

In order to control the gripping pressure of a coupling formed by external contraction, two types of gage sensitive to change in internal circumference have been devised the first of which is shown in Fig. 19 and is operated by compressed air supplied through tube 81 through a hand regulated valve 82 by which the pressure in chamber 83 can be maintained at some desired pressure as indicated by gage 84. The air from chamber 83 passes through a measuring orifice 85 into a chamber 86 which is connected by a number of radial passages to the annular duct 88. From this annular duct the air escapes between the inside surface of the hollow cylinder 10 being measured and the labyrinth surface of the standard cylinder 89 forming the main body of the gage. The resistance to the air passing between the standard cylinder 89 and the cylinder to be measured 10 is reflected in the pressure retained in chamber 86 as measured by gage 90. The cylinder 89 should be approximately centered in the cylinder 10 which is accomplished by the spring loaded centering plungers 91.

Figs. 20 and 21 show a form of hydraulic gage sensitive to the internal diameter of cylinders which consists of a flexible tube 92, similar to a Bourdon tube, mounted on the periphery of a disk of such diameter that the flexible tube will be sensitive to cylinders in the range of circumferences desired. The flexible tube is in hydraulic communication with the radial ducts 94 which converge at a point 95 which is in communication with a pressure gage 96 which is calibrated in terms of the internal circumferences of cylinders in which the measuring device is disposed.

It will be understood that the above description and accompanying drawings comprehend only the general and preferred embodiments of the invention and that various changes in construction, proportion and arrangement of the parts may be made within the scope of the appended claims without sacrificing any of the advantages of the invention.

The invention described herein may be manufactured and used by or for the Government of the United States of America for governmental purposes without the payment of any royalties thereon or therefor. All rights of commercial and private use are however reserved for the inventors.

What is claimed is:

1. A method of applying to a hose end a connection comprising inner and outer sleeves, said method including the steps of assembling both sleeves on the hose end, applying radial pressure to one of the sleeves so that the hose is compressed between the sleeves, measuring the change in dimension produced in the second sleeve by compression of the hose, and terminating the application of pressure on the first sleeve when the measurement of the second sleeve indicates a compression within the desired range.

2. A method of applying to a hose end a connection comprising inner and outer sleeves, said method including the steps of assembling both sleeves on the hose end, expanding the inner sleeve so as to compress the hose between the sleeves, measuring the increase in circumference of the outer sleeve produced by compression of the hose, and terminating the expansion of the inner sleeve when the measurement of the outer sleeve indicates a compression within the desired range.

3. A method of applying to a hose end a connection comprising inner and outer sleeves, said method including the steps of assembling both sleeves on the hose end, contracting the outer sleeve so as to compress the hose between the sleeves, measuring the decrease in circumference of the inner sleeve produced by compression of the hose, and terminating the contraction of the outer sleeve when the measurement of the inner sleeve indicates a compression within the desired range.

CARL R. MIDTLYNG.
HENRY S. YOUNG, Jr.

REFERENCES CITED

The following references are of record in the file of this patent:

UNITED STATES PATENTS

| Number | Name | Date |
|---|---|---|
| 2,089,790 | Halpern | Aug. 10, 1937 |
| 1,523,530 | Hupman | Jan. 20, 1925 |
| 2,174,217 | Rubin | Sept. 26, 1939 |
| 2,324,030 | Schellin et al. | July 13, 1943 |
| 2,355,852 | Fisher | Aug. 15, 1944 |
| 2,041,915 | Fisher | May 26, 1936 |
| 2,389,098 | Welch | Nov. 13, 1945 |
| 2,028,316 | Brunner | Jan. 11, 1936 |
| 1,753,005 | Grady | Apr. 1, 1930 |
| 1,951,860 | Cowles | Mar. 20, 1934 |
| 2,025,427 | Weatherhead, Jr. | Dec. 24, 1935 |
| 2,073,909 | Stecher | Mar. 16, 1937 |
| 2,216,686 | Fentress | Oct. 1, 1940 |
| 2,338,666 | Nelson | Jan. 4, 1944 |
| 2,333,349 | Weatherhead, Jr., et al. | Nov. 2, 1943 |
| 2,310,536 | Nelson | Feb. 9, 1943 |
| 2,293,997 | Neuhas | Aug. 25, 1942 |
| 2,262,212 | Stone | Nov. 11, 1941 |
| 199,350 | Caswell | Jan. 22, 1878 |
| 888,239 | Kelly | May 19, 1908 |
| 533,662 | McCormack | Feb. 2, 1895 |
| 2,190,386 | Scholtes | Feb. 13, 1940 |
| 1,795,487 | Grady | Mar. 10, 1931 |
| 1,929,750 | Loughead | Oct. 10, 1933 |
| 2,181,673 | Tompkins | Nov. 28, 1939 |
| 2,146,756 | Miller | Feb. 14, 1939 |
| 1,977,917 | Norgren | Oct. 23, 1934 |
| 105,895 | Bonham | Aug. 2, 1870 |
| 1,971,271 | Mennesson | Aug. 21, 1934 |
| 691,446 | Colby | Jan. 21, 1902 |
| 1,680,650 | Travis | Aug. 14, 1928 |